United States Patent
Beguin et al.

(10) Patent No.: US 6,587,626 B2
(45) Date of Patent: Jul. 1, 2003

(54) LIQUID OVERCLAD-ENCAPSULATED OPTICAL DEVICE

(75) Inventors: Alain M. J. Beguin, Vulaines sur Seine (FR); Christophe F. P. Renvaze, Avon (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/761,611

(22) Filed: Jan. 16, 2001

(65) Prior Publication Data

US 2001/0024556 A1 Sep. 27, 2001

(30) Foreign Application Priority Data

Mar. 23, 2000 (EP) ............................................. 00400816

(51) Int. Cl.$^7$ ................................................ G02B 6/02
(52) U.S. Cl. ......................................... 385/125; 385/16
(58) Field of Search ............................ 385/17, 16, 18, 385/125

(56) References Cited

U.S. PATENT DOCUMENTS

| | | | |
|---|---|---|---|
| 5,233,459 A | 8/1993 | Bozler et al. | 359/230 |
| 5,519,565 A | 5/1996 | Kalt et al. | 361/280 |
| 5,761,350 A | 6/1998 | Koh | 385/14 |
| 5,781,331 A | 7/1998 | Carr et al. | 359/288 |
| 5,960,132 A | 9/1999 | Lin | 385/18 |

FOREIGN PATENT DOCUMENTS

| | | | |
|---|---|---|---|
| EP | 0 961 150 | 12/1999 | G02B/26/02 |
| JP | 08-201857 | 8/1996 | G02B/6/12 |

*Primary Examiner*—Frank G. Font
*Assistant Examiner*—Kaveh Kianni
(74) *Attorney, Agent, or Firm*—Joanne N. Pappas (57) ABSTRACT

An optical device includes a planar substrate (10) on top of which is deposited a layer of waveguide material (402). A waveguide circuit (404) is etched into the waveguide material (402). A cover (426) selectively encapsulates the substrate (10) around the waveguide circuit (404) while leaving space to provide a gap above the waveguide circuit (404). A liquid material (30) having a lower index of refraction than the waveguide material is filled into the gap above the waveguide circuit (404) such that the liquid acts as an overclad for the waveguide circuit (404).

17 Claims, 12 Drawing Sheets

LIQUID OVERCLAD-ENCAPSULATED OPTICAL DEVICE

CROSS REFERENCE TO RELATED APPLICATIONS

This application claims the benefit of European Application No. 00400816.5, filed Mar. 23, 2000.

FIELD OF THE INVENTION

This invention relates generally to planar optical devices. In particular, the invention relates to optical devices such as an optical switching array that uses a variable filter element, or a mirror, immersed within an optical planar device.

BACKGROUND OF THE INVENTION

Planar optical devices are known where at least an integrated optical waveguide is fabricated as one or more layers of waveguide material (such as silica, a dielectric, a thin film, a polymer, a sol-gel) deposited on an insulator or other substrate using micro-electronic techniques such as vapor deposition, sputtering, or epitaxial growth, or a micro-replication technique such as embossing or printing, and patterned using techniques such as photolithography, e-beam lithography, or micro-molding. Such a waveguide conventionally having a core embedded between a solid underclad layer and a solid overclad layer is often used as a first substrate for interfacing with another substrate or hybridized with another electrical component.

Such planar fabrication techniques have evolved to form very special types of optical devices, such as micro-electro-mechanical system (MEMS) optical devices having specialized optical features or configured for various optical functions.

As one example, switch arrays with movable micro-electro-mechanical system (MEMS) mirrors or other types of variable filters used to direct the propagation of light at the cross-points of waveguides are one type of such known MEMS substrates.

One fabrication approach uses an index-matching fluid as the switching element for a planar MEMS switch. A planar waveguide array is formed on a first planar substrate. Trenches are formed at the cross-points and are filled with a fluid that matches the refractive index of the waveguide core. In order to actuate the switch, the fluid is either physically moved in and out of the cross-point using an actuator, or the fluid is thermally or electrolytically converted into a gas to create a bubble. For this approach to work, the facets cut at the end of the waveguide at the cross-points must be of mirror quality, since they are used to reflect the light into the desired waveguide. Finally, the fluid must be withdrawn cleanly to preserve the desired facet geometry and to prevent scattering or beam spreading losses due to any remaining droplets.

In another approach, a beam from a second substrate, referred to as the MEMS substrate, is disposed diagonally over a gap in a waveguide of the first substrate. A mirror from the MEMS substrate is suspended from the beam into the gap of the first substrate. An electrode is disposed adjacent to the gap and underneath the beam. When the electrode is addressed, the beam and mirror move into the gap to reflect light propagating in the waveguide. This method is also subject to beam-spreading problems such that the typical losses from such a switch would be high.

Often, the MEMS substrate and the waveguide planar substrate which supports the MEMS substrate will be fabricated separately and then assembled together. The assembly technique is thus constrained by the height of the mirror and the depth of the trench in the waveguide planar substrate. Conventionally, the maximum depth of the trench is set by the etching process limitation and the minimum by the solid overclad thickness required for a low-loss optical propagation in the waveguide. The height of the MEMS mirror is also determined by the fabrication process. Hence, in actual implementation, the maximum gap between these two substrate is 5 $\mu$m. The assembly technique for interfacing these two substrate must fit in this gap. However, standard flip-chip solder bump technology requires a height of 10 $\mu$m and thus cannot be used with a conventional waveguide structure having an overclad as the first substrate. Because the assembly must also provide an electric connection between corresponding pads of the two substrates, standard glue cannot be used. Conductive glues are usually thick, above 20 $\mu$m. Generalizing this assembly constraint to other optical devices, the problem to be solved requires a reliable assembly technique at the interface of any two substrates which have to be electrically connected without suffering an optical loss.

A need therefore exists for better planar fabrication or assembly techniques to optimize functions of optical devices such that, for example, a minimal loss optical switch having splitting or variable switching features can be easy and reliable to assemble at the interface of the two substrates.

SUMMARY OF THE INVENTION

The present invention addresses the needs discussed above. A planar optical device and its method of fabrication includes a planar substrate on top of which is deposited a layer of waveguide material. A waveguide circuit is etched into the waveguide material. A cover selectively encapsulates the substrate around the waveguide circuit while leaving space to provide a gap above the waveguide circuit. A liquid material having a lower index of refraction than the waveguide material is filled into the gap above the waveguide circuit such that the liquid acts as an overclad for the waveguide circuit.

One aspect of the present invention is that an optical device includes an optical path characterized by a refractive index, for propagating a light signal. An optical modifying element is disposed in the optical path for modifying the light signal. An overclad liquid having a refractive index less than the refractive index of the optical path is then disposed between the optical path and the optical modifying element for reducing optical loss of the light signal.

Another aspect of the present invention is that the optical modifying element can be another substrate to be interfaced with a first substrate.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

The present invention teaches the removal of the conventional overclad layer in the first substrate on top of which, a second substrate, such as the MEMS die must sit. Elimination of this overclad layer allows a thicker assembly technique to be used, such as 25 μm flip chip solder balls or 20 μm conductive glues. An index matching liquid or fluid is then taught to be used as the overclad substitute. Because the index of this liquid matches the appropriate overclad material that would have been used, there is no additional optical loss in light propagation in the waveguide of the first substrate. Furthermore, because the core of the waveguide planar substrate is exposed when the assembly between the two substrates occurs, alignment marks on the core level are visible, allowing a more precise positioning of the mirror, or any other optical feature disposed between the two substrates, within the trench, cavity or any other corresponding receptacle of the first substrate. With improved assembly precision comes better optical performance.

Figure 4:
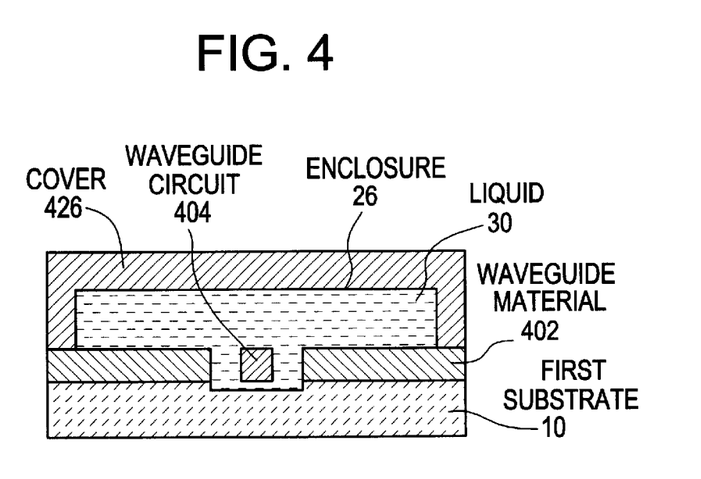
FIG. 4 is a sectional view of a generalized embodiment, in accordance with the present invention.

Even though a single substrate could benefit from the inventive use of a liquid overclad instead of a solid overclad, such as seen in FIG. 4, the present invention is especially advantageous when a second substrate forming a device that passively or actively alters the light propagation in the waveguide of the first substrate is present. In this case, the use of the liquid overclad is justified by the need to get the altering device physically as close as possible to the waveguide itself of the first substrate.

The liquid overclad, in accordance with the present invention, provides the room needed to attach a second substrate, such as a MEMS device. By replacing all of the solid overclad, or a significant amount of the solid overclad by an index matching fluid, the planar fabricating process is simplified by removing the steps of laying down, patterning and etching of the solid overclad. This same advantage can be found in any optical device where an index matching fluid is used to fill an interface gap in the waveguide. Thus, in general, an index matching liquid or fluid fills the gap between the inserted material and the waveguide. In other words, any assembly, such as a hybrid optical assembly, combining a waveguide and other devices inserted in the waveguide path and thus requiring an index matching action to minimize optical loss, can also benefit from the invention. The preferred embodiment of the present invention is hereinafter described in greater detail with reference to the accompanying drawings.

Figure 1:
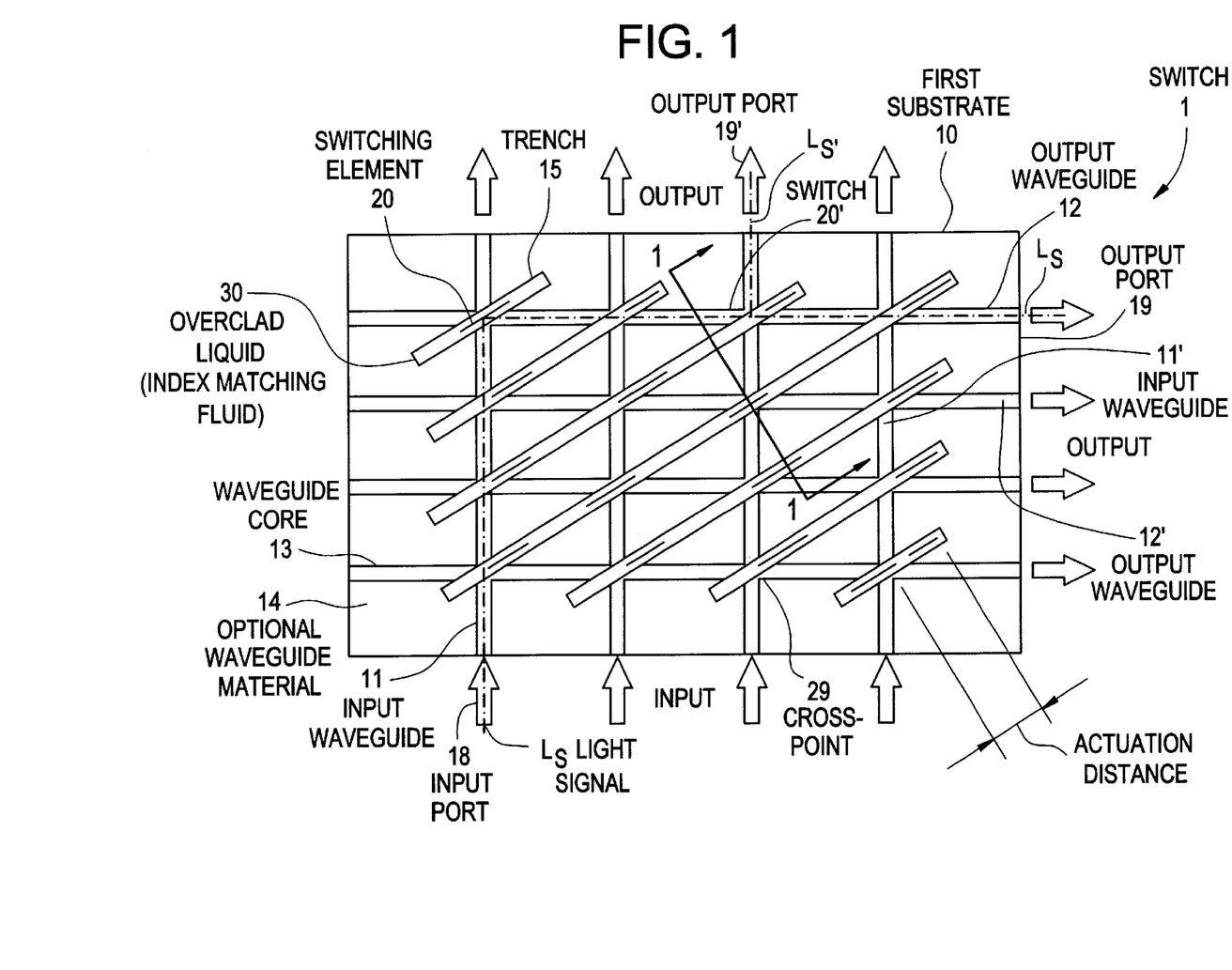
FIG. 1 is plan view of an application example of the present invention.

To better illustrate the fabrication techniques of the present invention, an exemplary embodiment of an optical device, in the form of an optical switch is shown in FIG. 1, and is designated generally throughout by reference numeral 1.

In accordance with the invention, the present invention for the fabrication techniques to improve the assembly of an optical switch includes a movable MEMS mirror for total reflection or another type of filter 22 for partial propagation of a light having a predetermined wavelength disposed in a trench 15 that is filled with a non-conducting, low-viscosity, overcladding-index-matching fluid or liquid 30.

The index-matching fluid 30 functions as an overclad by matching to the index of an optional overcladding material deposited below the core 13 or the substituted solid overclad. Basically, the liquid or fluid 30 has a lower index than the waveguide material so that the liquid 30 acts as an overclad, instead of a conventional solid overclad. The index matching fluid 30 optimizes single mode guided propagation of the light in a waveguide. The index matching liquid 30 will not prevent spreading of the light, although it may reduce the spreading a little bit. The main purpose of the index matching fluid 30 is to prevent reflection at the interface between the waveguide core 13 and the air in the trench 15. Without the index matching fluid 30, some light is reflected at the interface and lost, or worse, the light could be propagating backwards in the waveguide (back-reflection). The amount of light reflected at the interface is a function of the index mismatch at the interface, thus the terminology of index matching material for the fluid or liquid 30. Ideally, the index matching fluid in the case of a trench through a waveguide would have an index value equal to the effective index of the waveguide. The effective index is roughly the index of the core at the wavelength compensated by a small correction factor due to the marginal energy of the propagation mode travel in the overclad. According to the teachings of this invention, the fluid 30 is not matched exactly to the effective index of the waveguide, but the index of the overclad material. Thus a slight index mismatch is introduced at the interface. This index mismatch is very small because the core index is usually very close to the overclad index anyway. The index of the overclad must be lower than the index of the core to have a light guiding effect. The difference maybe minute, but it must exist. In one exemplary light optical waveguide circuit, the overclad has a refractive index 0.3 to 0.8% lower than the core. Hence, the overclad liquid 30 preferably has a refractive index slightly lower than the refractive index of the waveguide core 13. Of course, if the index difference is too big, the liquid 30 will still act as an overclad, but will be a poor index matching fluid at the interface. Thus, the very small index mismatch taught by the present invention produces very little reflection at the interface, and therefore should have a minimum impact on the optical losses. Actually, losses are dominated by the spreading of the beam in the trench 15 and the fact that the waveguide on the other side of the trench does not capture all of the spreaded beam.

Some available index liquid of very low nD index values are usually based on fluorinated compounds, but most of these liquids were not designed to lower the light absorption but rather to just have a low index (nD). Absorption is not a relevant concern in general when using index liquids, because liquid thickness is usually very small. To reduce the absorption of the liquid, the C—H, N—H and of course the O—H group in the liquid should be limited, and thus a good solution is to replace hydrogen by fluorine atoms or chlorine atoms. Aromatics are also a way of reducing (but not eliminating) the number of absorbing C—H. So in conclusion, to provide a liquid overclad with low absorption, the use of an overclad liquid with fluorinated or chlorinated molecules is preferred as an example of the liquid overclad 30.

Index matching liquid are widely used in optics, but as their name implies, they are used for matching the index of two optical parts and not to act as an overclad. Examples of index matching liquid that the present invention teaches as use for an overclad fluid is CARGILLE Immersion Liquid, nD25° C.=1.4670 from CARGILLE LABORATORIES INC. This kind of index matching liquid could be used as a liquid overclad, but the problem with the commercially available liquid is that they usually absorb a little of the light. Hence, for the present invention, a specially made liquid overclad, preferably based on fluorinated compound to have a non-absorbing liquid is taught. But depending on the level of optical losses that can be tolerated, 'standard' index matching fluid may be used.

FIG. 1 is a plan view of an optical switch 1 of the first embodiment of the present invention. The switch 1 is a waveguide matrix or waveguide circuit 200 formed from a waveguide core material 13 and an optional overclad material 14, which are deposited on a first substrate 10. The core 13 and the optional overcladding 14 are arranged on the first substrate 10, to form a plurality of input waveguides 11 and a plurality of output waveguides 12. A plurality of trenches 15 are formed at cross-points 29 wherein input waveguides 11 or 11' intersect output waveguides 12 or 12'. One of ordinary skill in the art will recognize that there are several ways to form the trenches 15. First, the trenches 15 can be formed as shown in FIG. 1, as continuous diagonal channels that intersect a plurality of cross-points. Alternatively, the trenches 15 can be disposed as discrete wells, formed separately and intersecting a single cross-point.

A plurality of independently movable switching elements 20 are disposed in trenches 15 at each cross-point 29. Each switching element 20 can be independently moved between an open position and a closed position. In the open position, light is allowed to propagate through the switch cross-points 29. In the closed position, switching element 20 is moved into the cross-point 29 to direct light into the output waveguide 12.

The operation of switch 1 is as follows. A light signal $L_S$ enters switch 1 by way of input port 18. The light signal $L_S$ propagates within input waveguide 11 until it is deflected into the output waveguide 12 by the switching element 20, which is in the closed position. Hence, the second substrate 40 modifies the optical function of the waveguide of the first substrate 10. Light signal $L_S$ exits switch 1 from output port 19. Note also that two-sided switches can be used to route light along multiple paths. Switch 20' is shown directing light signal $L_S$' to output port 19'. Thus, the present invention can be configured also as an N×M non-blocking cross-bar switch, along with other optical devices.

Figure 2:
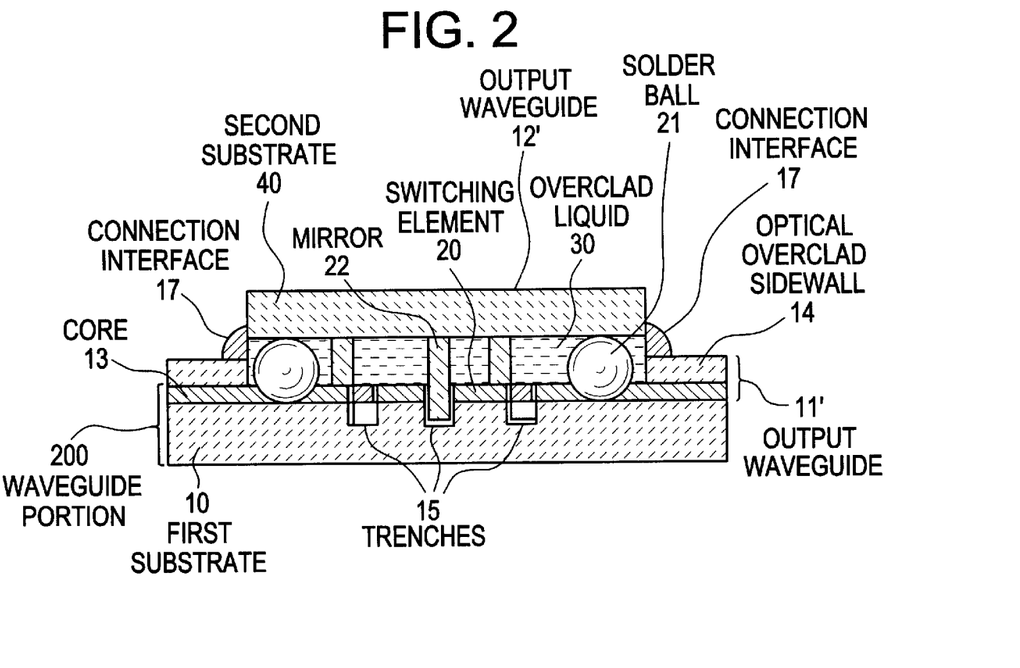
FIG. 2 is a sectional view of a first embodiment taken along lines 1—1 of FIG. 1, showing the relationship between the elements formed on the first substrate and the elements formed on the second substrate, in accordance with the present invention.

FIG. 2 is a sectional view of the optical switch 1 taken along lines 1—1 as depicted in FIG. 1. In a first embodiment, optical features, such as switching elements 20, are formed on a second substrate 40. The second substrate 40 is then aligned with the first substrate 10 such that the switching elements 20 are disposed in the plurality of trenches 15 or the first and second substrates are otherwise appropriately aligned. In accordance with the teachings of the present invention, the first substrate 10 is connected to the second substrate 40 by flip-chip bonding, including a flip-chip solder bump or ball 21 or similar methods to form a connection interface 17.

In a generalized embodiment, switching elements 20 or another optical feature can be formed on the first substrate 10, the second substrate 40, or on both. Hence, the optical feature of the second substrate 40 modifies the optical function of the waveguide of the first substrate 10. In this generalized embodiment or in the specific MEMS switch example, the optimized attachment or interfacing between the second substrate 40 and the first substrate 10 is accomplished with classical bonding techniques, such as flip-chip solder bumps 21 to provide the electrical connection. A glue or other types of sealing 172 deposited between the second substrate 40 and the optional overclad sidewall 14 functions merely as a cover or enclosure for allowing the overcladding liquid 30 to be filled within. As can be seen, the overclad 14 is limited to the area of the first substrate 10 not covered by the second substrate 40, such that portion of the output waveguide 11' could still be covered with the overclad.

Figure 3:
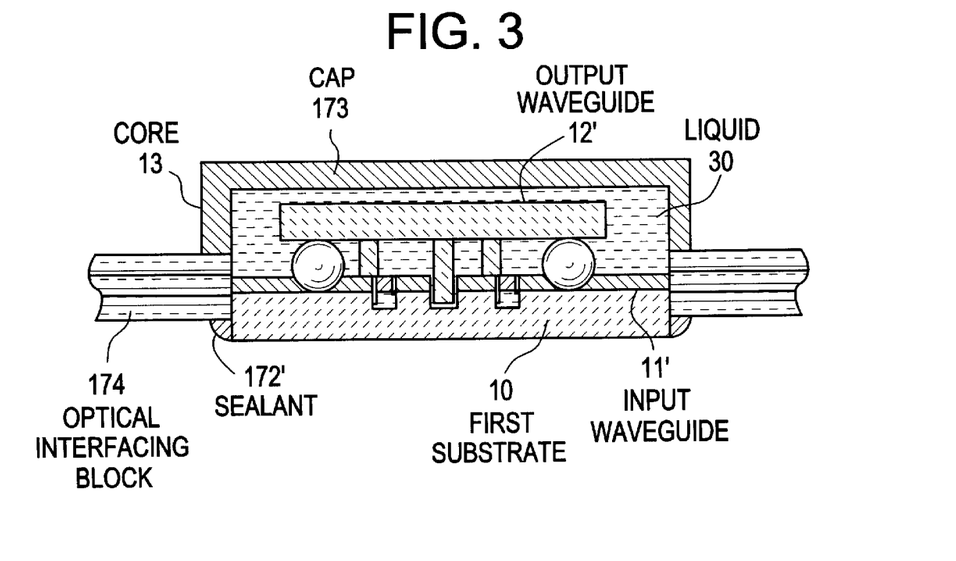
FIG. 3 is a sectional view of a second embodiment taken along lines 1—1 of FIG. 1 showing the relationship between the elements formed on the first substrate and the elements formed on the second substrate, in accordance with the present invention.

Alternatively and as seen in FIG. 3, the overclad can be completely eliminated if the index matching liquid 30 is present even above the output waveguide 11'. However, to contain the liquid 30, the entire assembly is immersed into the liquid 30 after pigtailing. If a separate cover is used, such as having a cap 173 sealed onto a pigtailing or another type of optical interfacing block 174 that is further glued or otherwise sealed with a sealant 172' to the first substrate 10 to form the enclosure, the overcladding liquid 30 can also be filled within the enclosure thus formed. However, if optical propagation losses is too high because the liquid 30 is absorbing more than a small amount of light, then a very thin overclad layer, in the range of 1–2 µm can be coated on top of the core 13. With such a thin overclad layer, good propagation can still be achieved while retaining the height advantage for bonding with no overclad.

As an example of an assembly of two substrates sharing an optical feature in-between, as in FIGS. 2 and 3, the switching element 20 includes a sliding MEMS mirror 22 on the second substrate 40, implemented as a MEMS chip. The sliding mirror 22 is connected to the MEMS chip as an optical feature of the second substrate 40, disposed in the trench 15, and immersed in the collimation maintenance fluid 30. The collimation maintenance fluid 30, is preferably a non-conducting, low viscosity fluid that has a refractive index that is closely or substantially matched to the refractive index of the optional overcladding sidewall 14 or other appropriate overcladding material for the core material 13. Electrically non-conducting fluid is required for all electrostatic actuators for MEMS switches in general, but is not required for magnetic actuators.

The mirror 22 or another optical feature is immersed in the fluid 30 for both the open and closed switching positions. This yields distinct advantages over the related art.

The size of the mirror or other filter 22 depends on the propagation mode size and thus the mirror size is a consequence of the core's cross-section, core index, and overclad index. In the present invention, the MEMS mirror 22 is only 25 µm in height.

The trench 15 is only 20 µm in depth. As a result, the maximum gap between the first and second substrates 10 and 40 is 5 µm where the assembly or interface 17 between the first and second substrates 10 and 15 must fit. Hence, the trench 15 must be etched to a sufficient depth to allow mirror 22 to eclipse substantially all (>99%) of the modal energy of the light signal when in the reflecting position.

Those of ordinary skill in the art will appreciate that other structures, such as gratings, refracting, filtering and non-linear elements, can be used to implement switching element 20 or that other structures having a shared feature between two substrates, whether both are planar or one being electronic, can be similarly hybridized or otherwise interfaced, in accordance with the teachings of the present invention. For example, another application where a liquid overclad can be used is with the placement of a non-linear material in a slot or trench in the waveguide, for any of the non-linear optical devices, such as isolators. Here, the non-linear material would be covered with the liquid overclad to avoid air-gaps between the waveguide and the non-linear material.

Referring to FIG. 4, a generalized optical device is shown, in accordance with the teachings of the present invention. The optical device includes a planar substrate 10 on top of which is deposited a layer of waveguide material 402, which could be a core only or a core layer deposited on top of the substrate or wafer. An underclad layer could be optionally used. An underclad layer is needed if the substrate or wafer is silicon, but the underclad is optional if the substrate is silica. A waveguide circuit 404 is etched into the waveguide material for example to form the input and output waveguides of a switching, isolating, filtering, or other optical modifying circuit. A cover 426, forming an enclosure 26, encapsulates the substrate 10 around the waveguide circuit 404 while leaving space to provide a gap above the waveguide circuit 404. A liquid material 30 having a lower index of refraction than the waveguide material fills the gap above the waveguide circuit such that the liquid acts as an overclad for the waveguide circuit 404.

Figure 5A:
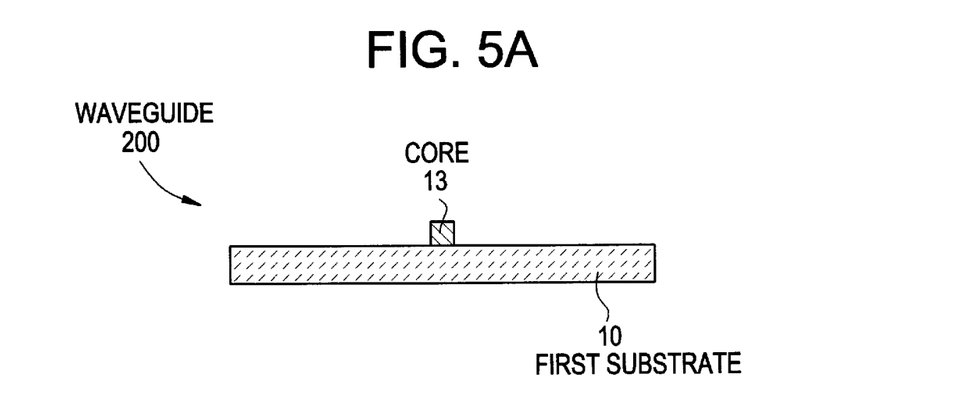
FIGS. 5A to 5K are a diagrammatic view of portions of the first embodiment of the present invention showing the optical switch of FIG. 2 at various stages of fabrication.

FIGS. 5A to 5G are diagrammatic views of a first embodiment of the present invention showing portions of the optical switch of FIG. 2 at various stages of fabrication. FIG. 5A shows the formation of a core 13 on the first substrate 10 to form a waveguide portion of the waveguide matrix 200. The first substrate 10 can be formed using any of the methods and materials commonly known to those of ordinary skill in the art. Such methods may include glass-forming methods, use of semiconductor materials such as silicon, chemical vapor deposition of silica, fused silica, ceramic materials, metallic materials, or polymeric materials. Thus, a planar optical device results where at least the integrated optical waveguide is fabricated as one or more layers of waveguide material having the core 13 is deposited on an insulator or other substrate 10 using micro-electronic techniques such as vapor deposition and patterned using techniques such as photolithography and electronic-beam lithography. Hence, the optical waveguide layer is layed-down, deposited or otherwise formed on the planar substrate 10. A variety of methods and materials can be used to form the waveguide layer, as mentioned previously, including: sol-gel deposition of silica; doped chemical vapor deposition of silica; organic-inorganic hybrid materials; or polymer materials. The waveguide layer includes waveguide core material 13 and an optional waveguide under-clad material below the core 13. Although other suitable materials may be used, such as silicon, preferably, the substrate 10 is a silica wafer coated with a silica layer produced by conventional techniques. The surface on which it is intended to deposit an etching mask is prepared as usual. The waveguide core 13 is preferably a doped silica deposited layer which is lithographed and etched to form the desired input and output waveguides of a waveguide circuit of FIG. 1.

Figure 5B:
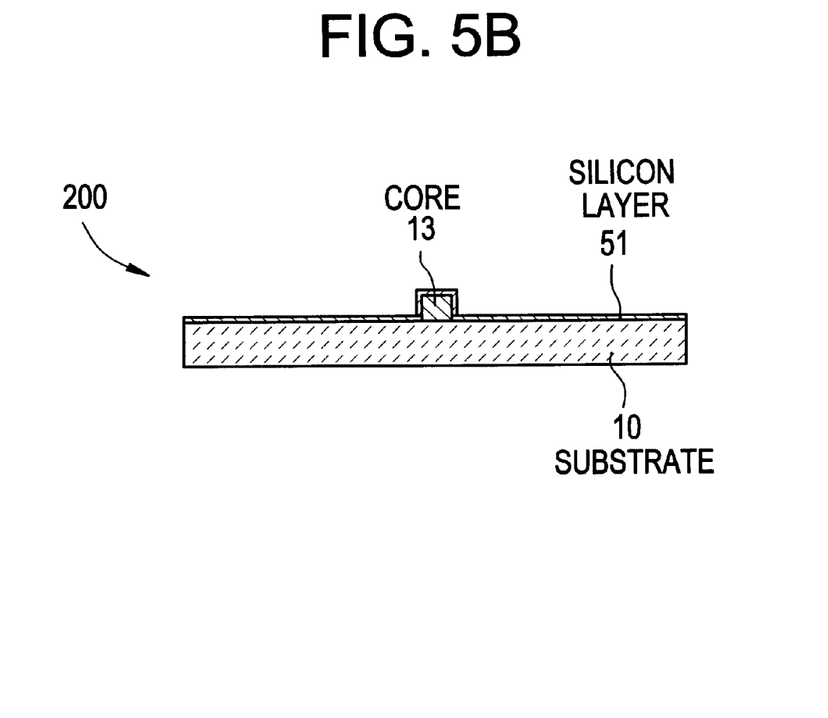

Next, as indicated in FIG. 5B, a silicon layer with thermal oxide 51 is deposited on the waveguide, comprising the substrate 10 and the core 13.

Figure 5C:
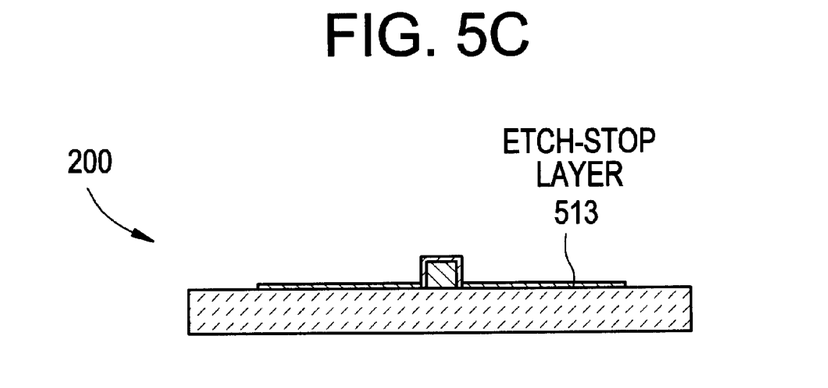

Referring to FIG. 5C, the silicon layer 51 is patterned by photolithography and etching to form an etch-stop layer 513 to avoid etching of the waveguide itself. After such a pattern is formed, the silicon surface is thermally oxidized into silicon dioxide so that the silicon etch-stop layer is coated with a very thin layer of silicon dioxide (silica) etching in preparation for an overclad coating deposition.

Figure 5D:
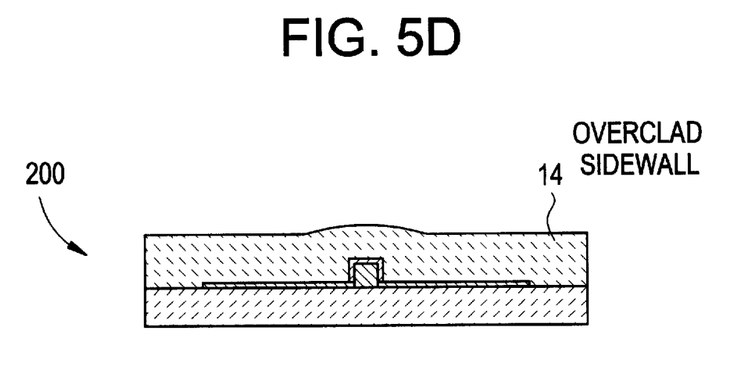

Referring to FIG. 5D, an overclad layer 14, preferably of doped silica, is deposited.

Figure 5E:
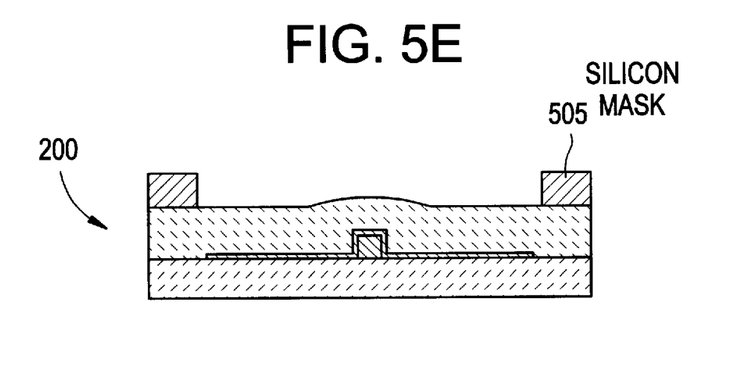

Referring to FIG. 5E, a silicon mask 505 is deposited and patterned over the overclad layer.

Figure 5F:
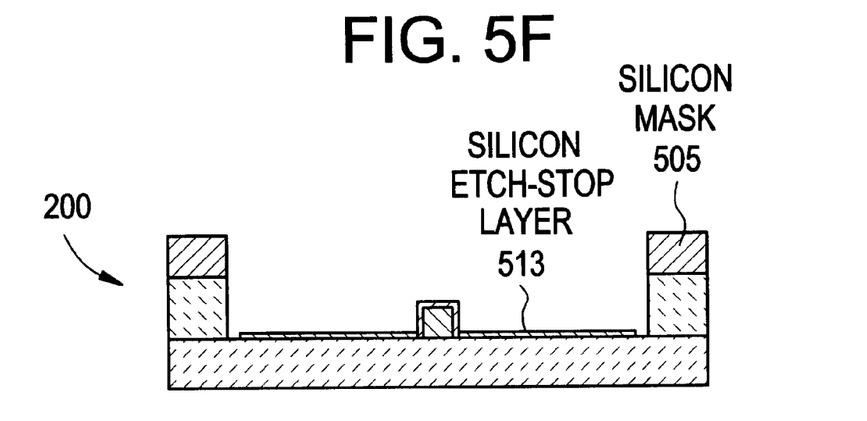

Referring to FIG. 5F, the overclad layer is etched away or otherwise opened-up everywhere not covered by the silicon mask. The silicon layer 513 acts as an etch stop layer because the chemistry chosen for the etchant is selective for etching the underlying silicondioxide (silica) but for slowly or not etching the silicon. Alternatively, a lift-off pattern can also be used to avoid deposition of the overclad 14 in the area underneath where the first substrate would be mounted.

Figure 5G:
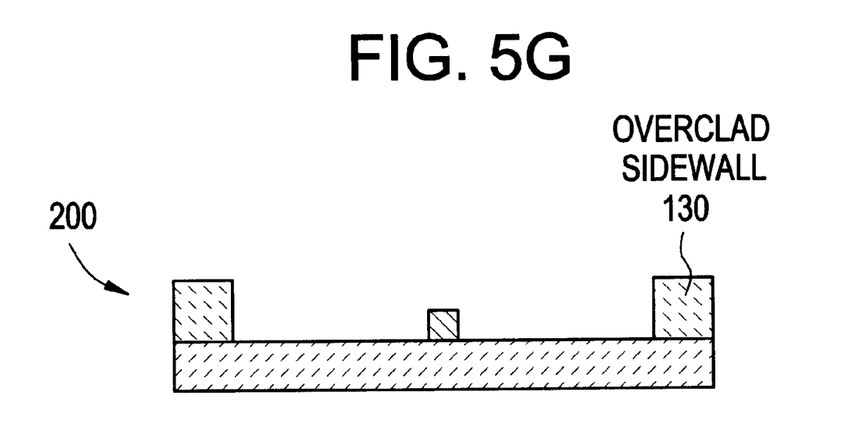

Referring to FIG. 5G, an overclad sidewall 130 is thus formed using etching techniques wherein both the silicon mask 505 and the silicon etch-stop layer 513 are etched selectively. Both the silicon stop-etch or etch-stop layer 513 and the silicon mask 505 are removed to form the overclad sidewall 130.

Figure 5H:
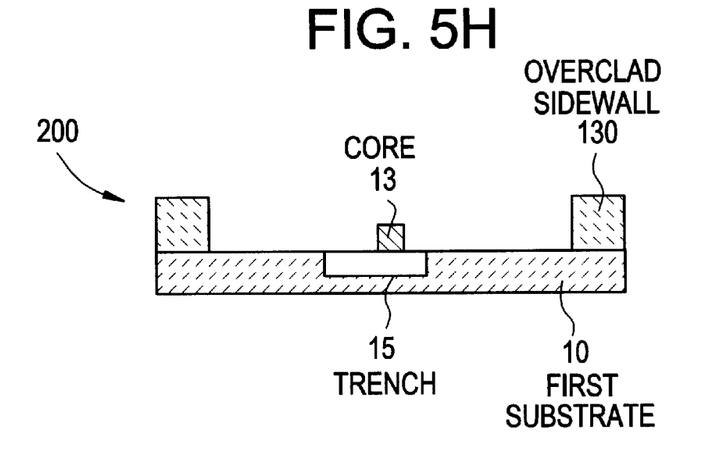

FIG. 5H shows one of a plurality of trenches 15 being formed at the diagonal cross points of the input and output waveguides but where only the output waveguide is visible as the core 13. Photolithographic techniques are used to form these trenches 15 on the substrate 10 where excess material from the substrate is later removed by etching.

Figure 5I:
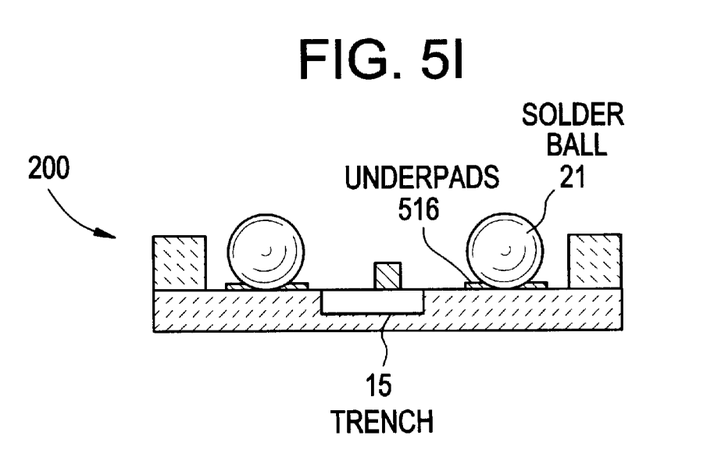

Referring to FIG. 5I, standard flip-chip solder bump or solder ball technology is used to lithograph and etch a deposited coating of metallization to form a pair of under-pads 516 on opposed sides of the trench 15. Lithography is further used to form the flip-chip solder balls 21 which are then deposited and reflowed on top of the opposed pair of underpads 516. Alternatively, a conductive polymer layer can be disposed and patterned to provide conductive polymer equivalents of the solder balls 21 and underpads 516. Another alternative is to deposit and pattern a thick gold layer or a layer of another metal and perform the bonding by thermocompression to provide a conductive bonding equivalent to the solder bump function.

Figure 5J:
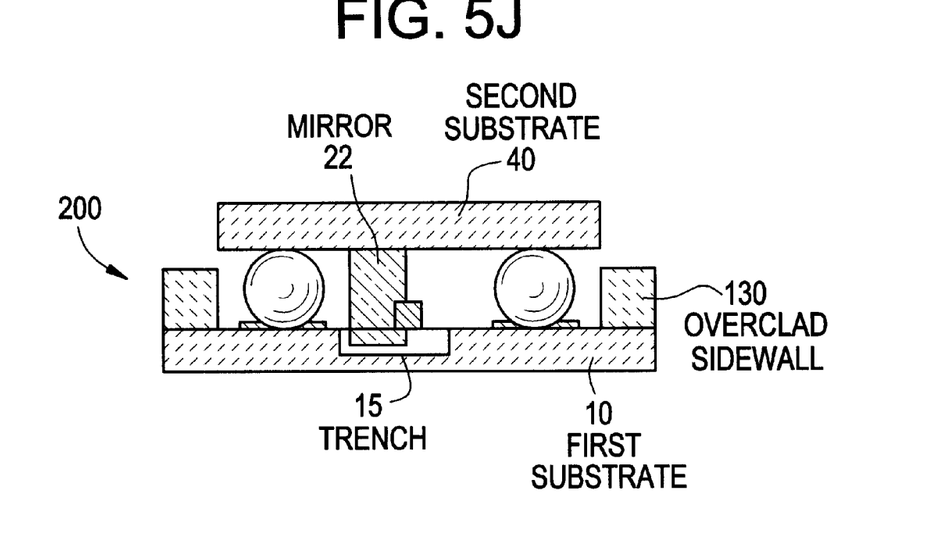
Figure 5K:
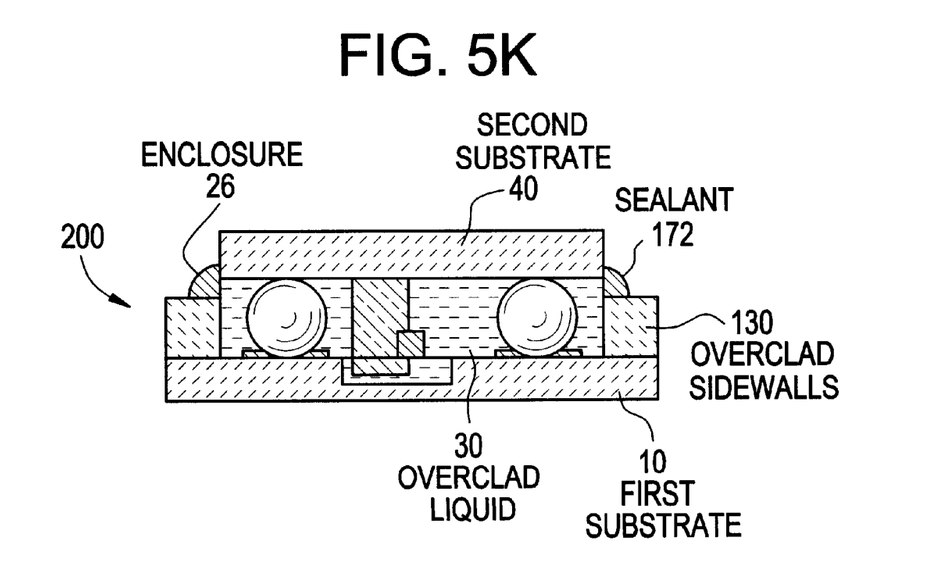

In FIGS. 5J to 5K, a first preferred method of assembling the switching element of a second substrate 40 with the first substrate 10 to provide an assembled result similar to FIG. 2 is described. In this example, the fabrication of the switch element having a switchable MEMS mirror 22 is carried out using micro-machining on the second substrate 40 which is preferably a MEMS substrate. As is shown in FIG. 5J, after several intermediate steps wherein holes are drilled and excess material is removed, the MEMS mirror 22 remain switchably anchored on the second substrate 40. After the second substrate 40 is aligned with the first substrate 10, the MEMS mirror 22 is inserted into the trench 15.

Referring to FIG. 5K, the first substrate 10 is then connected to the second substrate 40 by bonding or some other sealing means 172 to complete the enclosure or MEMS assembly area 26 provided by the overclad sidewall 130 disposed as a link between the first and second substrates. The trenches and the interior of the enclosure defined by the overclad sidewalls 130, the first substrate 10, and the second substrate 40 are filled with the overclad fluid 30 using access holes, which are then sealed.

FIGS. 6A to 6G are diagrammatic views of a second embodiment of the present invention showing portions of the optical switch of FIG. 3 at various stages of fabrication.

Figure 6A:
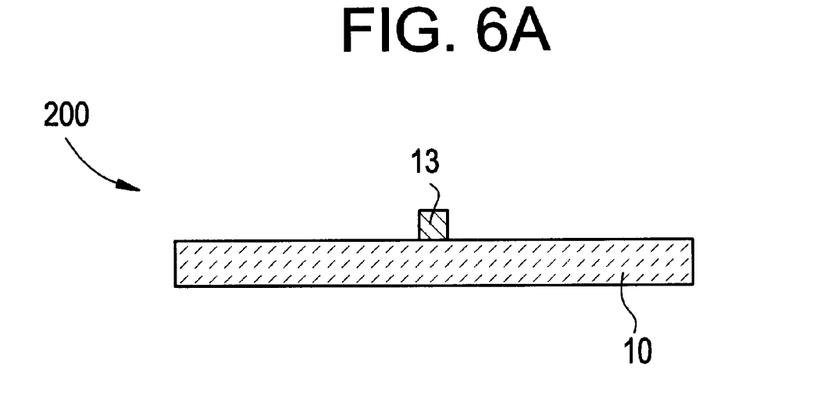
FIGS. 6A to 6G are a diagrammatic view of portions of the second embodiment of the present invention showing the optical switch of FIG. 3 at various stages of fabrication
Figure 6B:
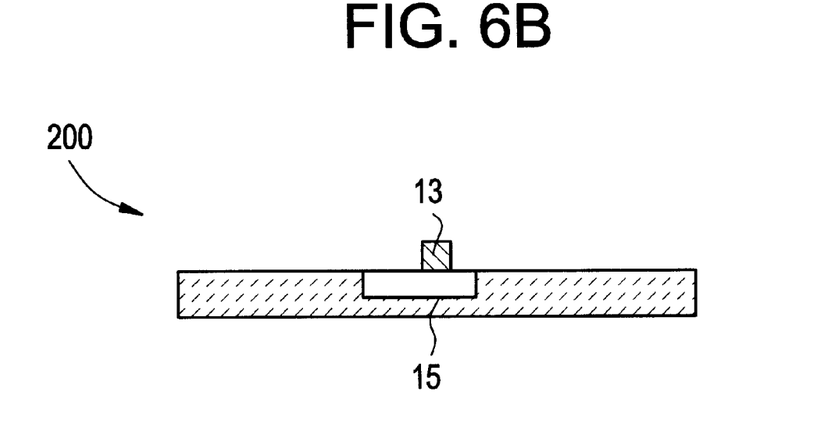

As in FIG 5A, FIG. 6A shows the formation of the core 13 on the first substrate 10 to form a waveguide 200, after standard planar deposition, lithography, and etching processes. In this approach, no overclad sidewall 130 is used to form part of the enclosure. Hence, the process depicted in FIG. 6B is very similar to that of FIG. 5H, without the intervening steps of FIGS. 5B–5G. The planar waveguide processing of the first substrate 10 is then greatly simplified because there is no need now for the overclad deposition at all.

FIG. 6B thus shows one of a plurality of trenches 15 being formed at the diagonal cross points of the input and output waveguides but where only the output waveguide is visible as the core 13. As before, photolithographic techniques are used to form these trenches 15 on the substrate 10 where excess material from the substrate is later removed by etching.

Figure 6C:
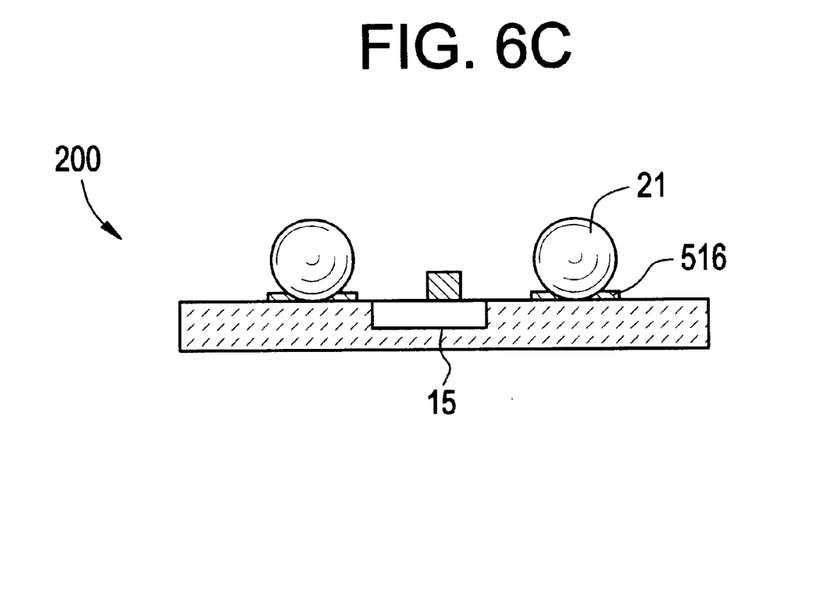

Referring to FIG. 6C, standard flip-chip solder bump or solder ball technology is used to lithograph and etch a deposited coating of metallization to form a pair of underpads 516 on opposed sides of the trench 15. Lithography is further used to form the flip-chip solder balls 21 which are then deposited and reflowed on top of the opposed pair of underpads 516. Alternatively, a conductive polymer layer can be disposed and patterned to provide conductive polymer equivalents of the solder balls 21 and underpads 516. Another alternative is to deposit and pattern a thick gold layer or a layer of another metal and perform the bonding by thermocompression to provide a conductive bonding equivalent to the solder bump function. Other connection techniques could use mechanical fasteners or welding.

Figure 6D:
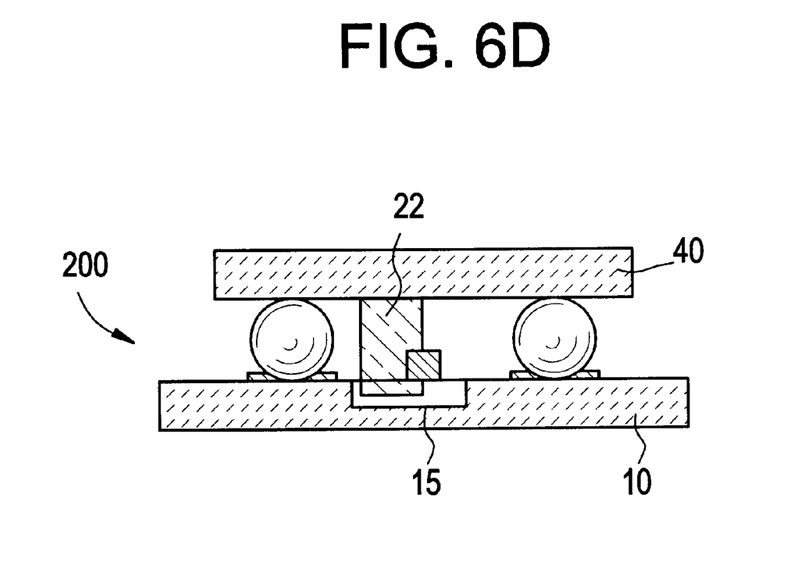

In FIGS. 6D to 6G, a second preferred method of assembling the switching element of the second substrate 40 with the first substrate 10 to provide an assembled result similar to FIG. 3 is described. As before, the fabrication of the switch element having a switchable MEMS mirror 22 is carried out using micro-machining on the second substrate 40 which is preferably a MEMS substrate. As is shown in FIG. 6D, after several intermediate steps wherein holes are drilled and excess material is removed, the MEMS mirror 22 remain switchably anchored on the second substrate 40. After the second substrate 40 is aligned with the first substrate 10, the MEMS mirror 22 is inserted into the trench 15.

Figure 6E:
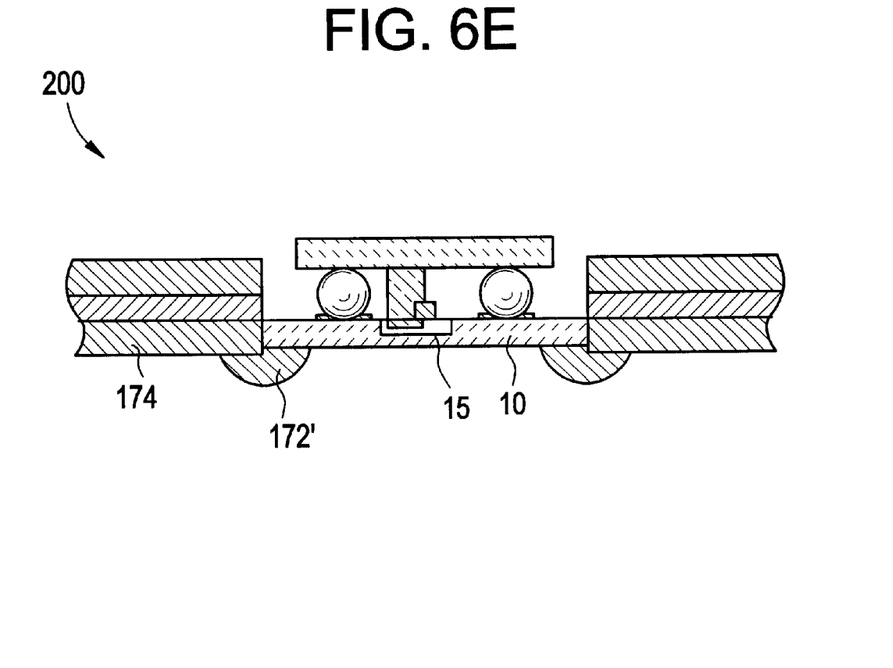
Figure 6F:
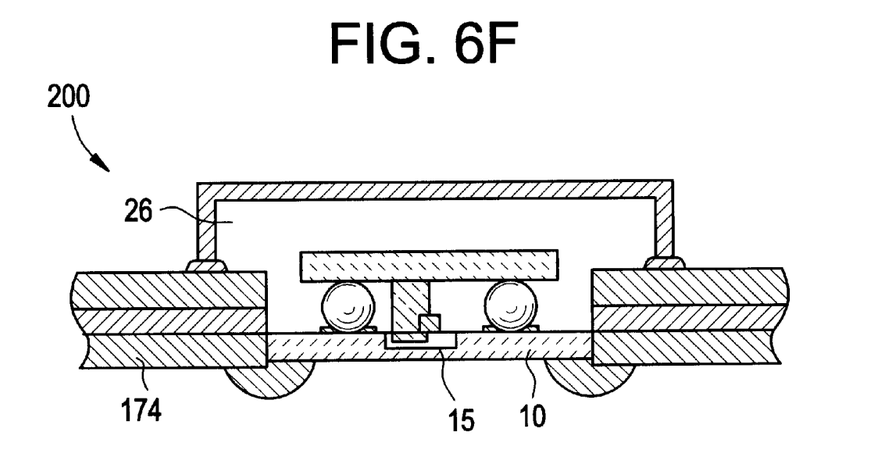
Figure 6G:
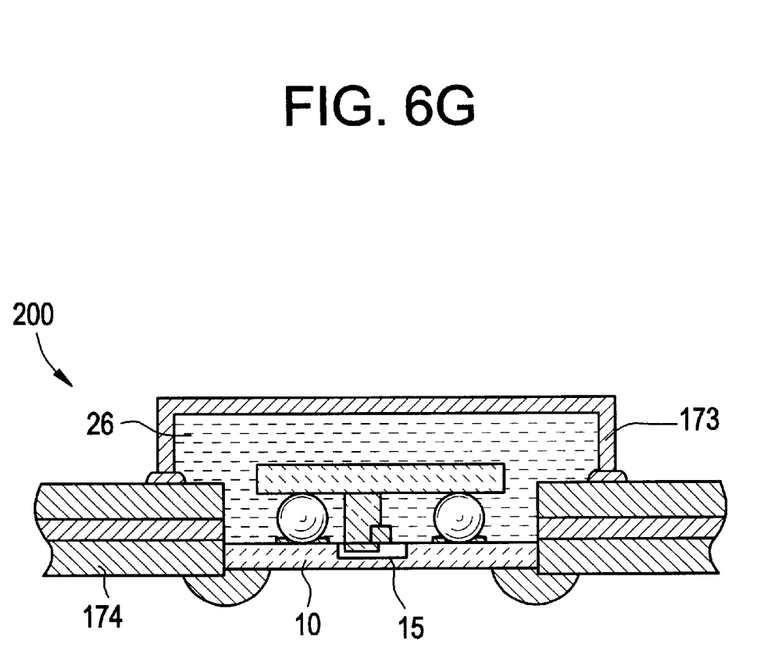

Referring to FIG. 6E, the first substrate 10 is then connected to a pigtailing block 174 by bonding or some other sealing means 172' to provide the sidewall function in forming a cavity that the overclad 130 provided in FIG. 5J. In FIG. 6F, to complete the enclosure or MEMS assembly area 26 provided by the pigtailing block 174 sealed to the first substrate 10, a cap 173 is disposed and sealed onto the pigtailing block 174 as a cover for the first substrate 10. Referring to FIG. 6G, the trench 15 and the interior of the enclosure 26 defined by the pigtailing block 174, the first substrate 10, and the cap 173 are filled with the overclad fluid 30, under vacuum, using access holes, which are then sealed.

While specific embodiments of the invention have been shown and described in detail as a MEMS switch, it will be understood that the invention may be modified for the assembly of other suitable substrates, needing interfacing, without departing from the spirit of the inventive principles as set forth in the hereinafter claims. Even the fabrication of one substrate could apply the teachings of the present invention to contain the liquid overclad by capsulating the exposed core with a suitable cap or cover. Thus, it is intended that the present invention covers the modifications and variations of this invention provided they come within the scope of the appended claims and their equivalents.

In summary, the present invention is to replace the solid overclad by a liquid overclad in any hybrid optical assembly that requires an index matching fluid between waveguides or between a waveguide and another material. The advantages are a simplification of the process by removing the overlad coating, patterning and etching steps (with a corresponding cost reduction), and the allowance of more flexibility in the assembly because the vertical gap is increased.

What is claimed is:

1. An optical device comprising:
   an optical path characterized by a refractive index, for propagating a light signal;
   an optical modifying element disposed in the optical path for modifying the light signal; and
   an overclad liquid having a refractive index less than the refractive index of the optical path disposed between the optical path and the optical modifying element for reducing optical loss of the light signal wherein said liquid fills trenches disposed on at least one crosspoint and having variable actuation distances.

2. The optical device of claim 1 wherein the optical path comprises a waveguide.

3. The optical device of claim 2 wherein the overclad liquid has the refractive index lower than the waveguide.

4. The optical device of claim 1 wherein the optical path comprises a waveguide core.

5. The optical device of claim 1 wherein the optical path comprises a waveguide having a core layer disposed on top of a substrate.

6. The optical device of claim 5 wherein the overclad liquid has the refractive index less than the core layer.

7. The optical device of claim 1 further comprising a cover for enclosing the overclad liquid within the optical path.

8. The optical device of claim 1 wherein the optical path comprises a waveguide circuit.

9. An optical device comprising:
   a planar substrate;
   a layer of waveguide material deposited on the planar substrate, the layer of waveguide material having a waveguide circuit etched into the waveguide material;
   a cover for selectively encapsulating the substrate around the waveguide circuit while leaving space to provide a gap above the waveguide circuit; and
   a liquid material having a lower index of refraction than the waveguide material filled into the gap above the waveguide circuit such that the liquid acts as an overclad for the waveguide circuit.

10. A method for fabricating a planar optical device, the method comprising the following steps:
    providing a planar substrate;
    depositing a layer of waveguide material onto the planar substrate;
    etching a waveguide circuit into the waveguide material;
    encapsulating the substrate around the waveguide circuit to provide a gap above the waveguide circuit, wherein said encapsulating step further comprises the following steps:
      depositing a solid overclad material layer on the waveguide material;
      forming an opposed pair of overclad sidewalls at opposed edges of the planar substrate by removing the solid overclad layer from the waveguide material away from the opposed edges of the planar substrate;

mounting a cover on top of the opposed pair of overclad sidewalls for covering the planar substrate; and filling the gap above the waveguide circuit with a liquid material having a lower index of refraction than the waveguide material such that the liquid acts as an overclad for the waveguide circuit.

11. The method of claim 10 wherein the encapsulating step comprises the following steps:

selectively depositing a solid overclad material layer on the waveguide material and forming an opposed pair of overclad sidewalls at opposed edges of the planar substrate by removing the solid overclad layer from the waveguide material away from the opposed edges of the planar substrate in a single selective deposition step; and mounting a cover on top of the opposed pair of overclad sidewalls for covering the planar substrate.

12. A method for fabricating a planar optical device, the method comprising the following steps:

providing a planar substrate;

depositing a layer of waveguide material onto the planar substrate;

etching a waveguide circuit into the waveguide material;

encapsulating the substrate around the waveguide circuit to provide a gap above the waveguide circuit;

filling the gap above the waveguide circuit with a liquid material having a lower index of refraction than the waveguide material such that the liquid acts as an overclad for the waveguide circuit; and inserting an optical modifying element disposed in the waveguide circuit for modifying a light signal wherein the inserting step comprises inserting a MEMS mirror of a MEMS substrate in the waveguide circuit for modifying the light signal.

13. The method of claim 12 further comprising the following steps:

etching a trench in the waveguide circuit such that the light signal follows a reflected optical path if the MEMS mirror is in a reflected state in the trench;

forming at least one flip-chip solder bump on the planar substrate on opposed sides of the trench; and flip-chip attaching the MEMS substrate on top of the flip-chip solder bumps wherein the MEMS mirror is slidable within the trench for covering a major portion of the trench.

14. The method of claim 13 wherein the etching step comprises providing access to the waveguide material by etching a trench through the waveguide circuit.

15. The method of claim 14 wherein the encapsulating step comprises the following steps:

selectively depositing a solid overclad material layer on the waveguide material;

forming an opposed pair of overclad sidewalls at opposed edges of the planar substrate by removing the solid overclad layer from the waveguide material away from the trench and away from the opposed edges of the planar substrate; and sealing the MEMS substrate to the opposed pair of overclad sidewalls as a cover for covering the planar substrate.

16. The method of claim 14 wherein the encapsulating step comprises the following steps:

pigtailing on opposed edges of the planar substrate for forming an opposed pair of pigtail blocks; and enclosing the MEMS substrate with a cover sealed to the opposed pair of pigtail blocks as a cover for enclosing the planar substrate.

17. The method of claim 12 wherein the filling step comprises filling the gap with the liquid material having a fluorinated compound.

* * * * *